W. E. WILLIAMS.
BUMPER FOR AUTOMOBILES.
APPLICATION FILED OCT. 3, 1921.
1,423,894.
Patented July 25, 1922.
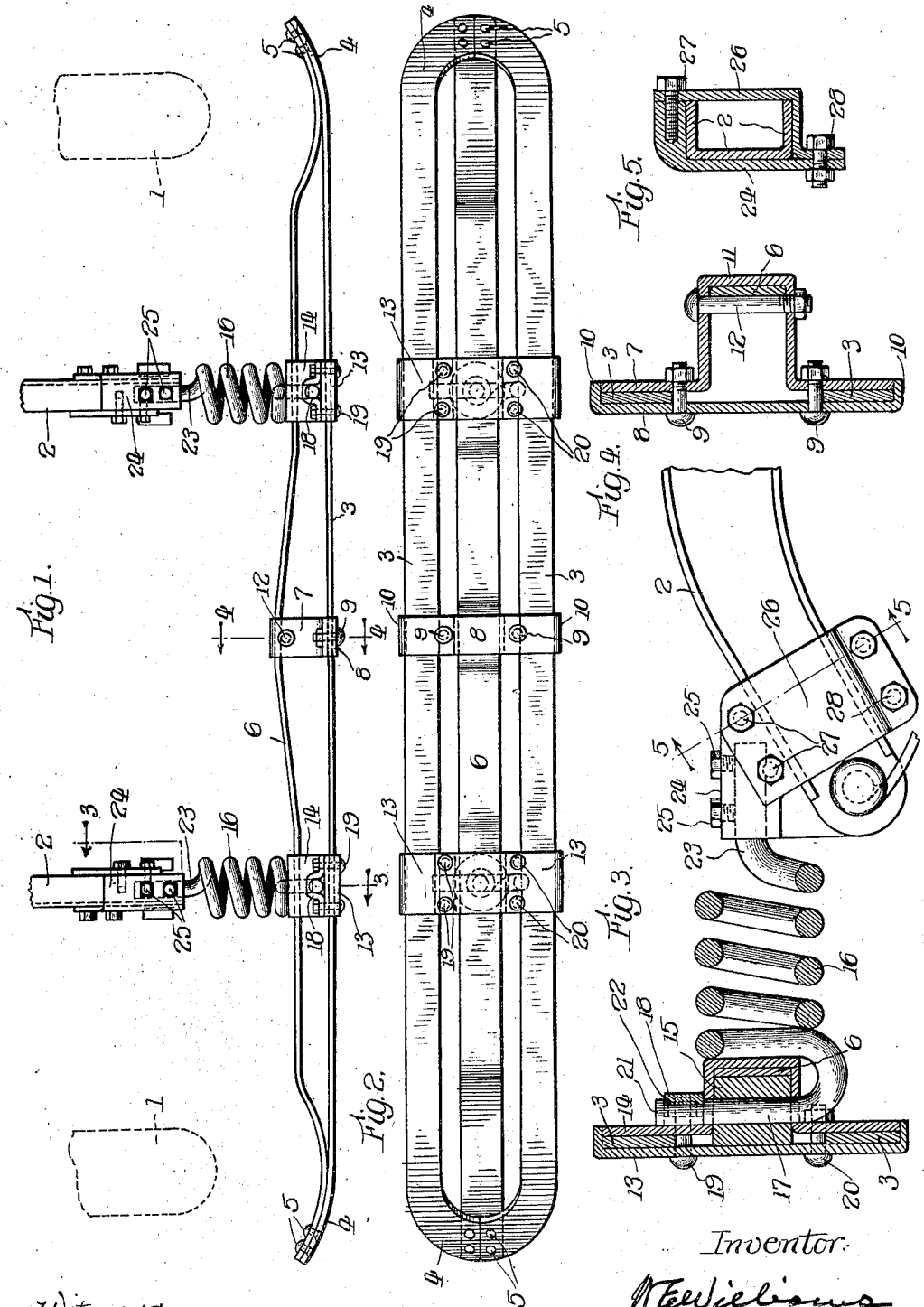
Inventor.
W. E. Williams
Witness:
A. J. Sauser.

UNITED STATES PATENT OFFICE.

WILLIAM ERASTUS WILLIAMS, OF WILMETTE, ILLINOIS.

BUMPER FOR AUTOMOBILES.

1,423,894.	Specification of Letters Patent.	Patented July 25, 1922.

Application filed October 3, 1921. Serial No. 504,842.

*To all whom it may concern:*

Be it known that I, WILLIAM ERASTUS WILLIAMS, a citizen of the United States, a resident of the village of Wilmette, county of Cook, and State of Illinois, have invented a new and useful Improvement in Bumpers for Automobiles, of which the following is a specification.

My invention relates to devices that are attached to the front and rear of automobiles commonly called cars in the trade, the purpose of which is to lessen the damage involved in collision shocks of various kinds.

The object of this invention is to provide a bumper having a large impact area so that it may receive the shock of impact in any probable line of impact with another vehicle, and which will return to normal position after impact, more readily than ordinary bumpers.

The invention is set forth in the claims.

Reference will be had to the accompanying drawing in which Figure 1 is a plan view of the bumper.

Figure 2 is a front elevation.

Figure 3 is an end elevation partly in section, on line 3—3 of Figure 1.

Figure 4 is a transverse sectional view on line 4—4 of Figure 1.

Figure 5 is a transverse section on line 5—5 of Figure 3.

In the drawing the automobile front wheels are indicated by 1 in dotted lines in Figure 1 and the front ends of the frame members of the automobile are indicated by 2.

I prefer to make the bumper beams of two flat bars of metal indicated by 3 which have their ends curved vertically and horizontally and joined together as indicated by 4 and these ends are connected by the rivets 5 on to the ends of a middle and rearwardly positioned flat spring bar 6. In place of relying on the splice, as it were, for the ends of the two bars 3 I may weld the ends together or make both bars in one piece bent U-shaped and make only one weld or splice at one end.

The bars 3 and 6 are connected at their middle by bracket pieces 7 and 8 which are bolted together by the bolts 9 thus clamping tightly the bars 3. The outer ends of the bracket piece 8 are turned over the edges of the bars 3 as indicated by 10. The bracket piece 7 has a rearwardly extending loop 11 which extends outside of the bar 6 and the bar 6 is retained in contact with the surface of this loop 11 by means of the bolt 12. The purpose of this central bracket is to act as a central tie between the bars 3 and the bars 6, forming a simulation of a truss construction and the three bars so connected together form a bumper beam of considerable strength and at the same time somewhat flexible in character to yield slightly on impact with any object that may come in contact with the bumper beam at any point on its face.

The members of this beam, composed of the bars 3 and 6, are tied together and supported by the brackets composed of the front bracket pieces 13 and rear bracket pieces 14 which are similar in construction to the bracket pieces 7 and 8, but in place of the bolt 12 for holding the parts 6 in place in the bracket, I provide blocks 15 made of wood if desired, or other suitable material.

To support the bumper beam and connect it to the frame of the car I provide coiled springs 16, the outer ends of which are turned up as indicated by 17 and pass through holes in the bracket pieces 14 and are secured in place by clamping blocks 18 secured by the bolts 19 which pass through the bracket pieces 13 and 14 and perform a double function of clamping the terminal portion 17 of the springs in position and likewise clamping the parts 3 in place. An extra set of bolts 20 at the bottom clamp the lower bar 3 in place in the bracket. The upper end 21 of each portion 17 of the spring 16 is notched out forming a little shoulder 22 into which the clamping blocks 18 fit, and thus prevent vertical movement of the brackets upon the ends 17 of the springs. The inner ends of the coiled springs 16 align with the central axis of the coiled spring as indicated by 23 and each end 23 is secured in a cavity in a block 24 by the screws 25.

The block 24 may be of any suitable form or construction, but I prefer to use what is here shown and it is provided with a seat which fits over the end of the frame 2 of the car and is clamped thereon by a clamping plate 26, through the medium of screws 27 and bolts 28, but any other suitable fastening may be provided for this block 24.

The character of the coiled springs 16 is such that the bumper beam may be pushed up and down or longitudinally and the springs will bend and yield and come back to normal position without taking permanent set in the average collision which a bumper of this class is expected to resist and at the same time these springs furnish the most desirable form of spring action in a direct head on impact. Not only that, but they serve to furnish a "sprung load" connection for the bumper beam to the frame of a car, to lessen the intensity of the impact shocks on the frame, resulting from the vibratory action of the car in traveling on the road as most bumpers provide for direct collision impact spring effect only and usually are so connected to the car frame that the bumper becomes a unitary part of the frame in so far as any vertical movements of the frame are involved.

A bumper should have an extensive collision surface, as has been already suggested, to ensure its striking any colliding object, and such a surface involves extra weight and increased strain on the frame. Such strains are minimized by securing the bumper to the frame by a support resiliently yieldable in all directions.

Traffic in our cities is becoming so congested that bumpers are necessary for safeguarding the cars themselves, in parking the cars and in turning out and in passing other cars, and it is necessary, for all features of use of a bumper, that the ends of the bumper be substantially as wide as the middle portion, so that the registry effect and the avoidance of telescopic action may be of service when one car is turning out from another to the same extent that might be involved by a direct line collision, and thus my bumper beams 3 with their ends turned into U shape or loop form are factors of service in a bumper for the purpose described, and this is provided by a very cheap construction as shown.

What I claim is:—

1. The combination with springs yieldable axially, in horizontal, vertical, and oblique planes, and adapted to be fixed to an automobile and project therefrom parallel to the axis thereof, of a bumper beam fixed to the terminal portions of said springs, whereby the beam readily yields to force acting axially or transversely with reference to the springs.

2. The combination with spaced bars adapted to extend from side to side of an automobile to protect its entire width, of springs adapted to support the bars from the automobile frame and to yield perpendicularly to the bars and in vertical, horizontal, and oblique planes perpendicular to the bars.

3. The combination with an automobile frame and a transverse horizontal bumper beam, of beam supporting spring coils having their ends secured to the frame and the beam, respectively.

4. The combination with an automobile frame, of a bumper beam extending horizontally across the frame, a series of bumper supporting spring coils, fastenings fixing corresponding ends of the coils to the frame, and clips detachably fixing the opposite ends of the coils to the beam.

5. In a bumper beam, the combination with two vertically spaced parallel bars having their bodies approximately in a vertical plane and their end portions rearwardly curved and united in a medial horizontal plane, of a third parallel bar lying in the rear of the vertical space between the front bars and connected at its ends with the corresponding ends of the front bars, the three bars being connected to each other and to the car frame members, with which they are in substantial alinement.

6. The combination with two terminally connected parallel flat front bars vertically spaced, of a third parallel bar at some distance in the rear of the space between the said two bars, connected to the end portions of the latter to form with them a truss like bumper beam, the three bars being centrally connected to each other and at points on opposite sides of their middle connected to car frame members.

7. An automobile bumper beam composed of three pieces, two of them extending across the front and spaced apart and with the third member located in the rear of the space between the other two, all said bars being connected together by a central bracket and a bracket on each side thereof, in simulation of a truss construction, the middle bracket having the greater front to rear depth, thus giving greater truss effect between the front members and the rear member.

8. In an automobile bumper, the combination with a bumper beam composed of three flat bars extending across the car, two forming the front contact face and having their ends vertically curved and joined together, and the third bar centrally and rearwardly located as relates to the two face bars, and all three of the bars connected and bent rearward near their ends; of a series of clips connecting the several bars intermediate their ends, and suitable means for connecting the said bars to the car frame.

9. The combination with an automobile frame, of a bumper beam, sockets fixed to the frame, clips attached to the beam, and beam supporting spring coils each having its ends secured in one of said sockets and one of said clips, respectively.

Signed at Chicago, in the county of Cook and State of Illinois, this 30th day of September 1921.

WILLIAM ERASTUS WILLIAMS.

Witnesses:
B. W. BERNHARD,
F. M. ZOBEL.